(12) United States Patent
Sukthankar et al.

(10) Patent No.: US 8,983,192 B2
(45) Date of Patent: Mar. 17, 2015

(54) HIGH-CONFIDENCE LABELING OF VIDEO VOLUMES IN A VIDEO SHARING SERVICE

(75) Inventors: Rahul Sukthankar, Orlando, FL (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 13/601,802

(22) Filed: Aug. 31, 2012

(65) Prior Publication Data

US 2013/0114902 A1 May 9, 2013

Related U.S. Application Data

(60) Provisional application No. 61/556,059, filed on Nov. 4, 2011.

(51) Int. Cl.
*G06K 9/46* (2006.01)
*H04N 9/82* (2006.01)
*H04N 21/234* (2011.01)

(52) U.S. Cl.
CPC ....... *H04N 9/8205* (2013.01); *H04N 21/23418* (2013.01)
USPC ..................................................... 382/190

(58) Field of Classification Search
CPC ....................................................... G06K 9/46
USPC ..................................................... 382/190
See application file for complete search history.

(56) References Cited

U.S. PATENT DOCUMENTS

| | | | |
|---|---|---|---|
| 2002/0176625 A1* | 11/2002 | Porikli et al. | 382/173 |
| 2003/0026594 A1* | 2/2003 | Shiiyama | 386/69 |
| 2007/0183497 A1 | 8/2007 | Luo et al. | |
| 2008/0270344 A1* | 10/2008 | Yurick et al. | 707/2 |
| 2009/0136208 A1* | 5/2009 | Gilboa-Solomon et al. | 386/95 |
| 2010/0045799 A1 | 2/2010 | Lei et al. | |
| 2012/0169923 A1* | 7/2012 | Millar et al. | 348/399.1 |

OTHER PUBLICATIONS

Spatio Temporal Segmentation of Video by Hierarchical Mean Shift Analysis. Daniel DeMenthon and Remi Megret. Jul. 2002.*
Automatic Identification of Digital Video based on Shot level Sequence Matching. Jian Zhou and Xiao-Ping Zhang. Nov. 2005.*

(Continued)

*Primary Examiner* — Stephen R Koziol
*Assistant Examiner* — Delomia Gilliard
(74) *Attorney, Agent, or Firm* — Fenwick & West LLP

(57) ABSTRACT

A volume identification system identifies a set of unlabeled spatio-temporal volumes within each of a set of videos, each volume representing a distinct object or action. The volume identification system further determines, for each of the videos, a set of volume-level features characterizing the volume as a whole. In one embodiment, the features are based on a codebook and describe the temporal and spatial relationships of different codebook entries of the volume. The volume identification system uses the volume-level features, in conjunction with existing labels assigned to the videos as a whole, to label with high confidence some subset of the identified volumes, e.g., by employing consistency learning or training and application of weak volume classifiers.

The labeled volumes may be used for a number of applications, such as training strong volume classifiers, improving video search (including locating individual volumes), and creating composite videos based on identified volumes.

20 Claims, 12 Drawing Sheets

(56) References Cited

OTHER PUBLICATIONS

Content browsing and semantic context viewing through JPEG 2000-based scalable video summary. J. Meessen L.Xu and B. Marq. Jun. 2006.*

Spatio-Temporal Segmentation of Video by Hierarchical Mean Shift Analysis. Daniel DeMenthon and Remi Megret. Jul. 2002.*

Volumetric Features for Video Event Detection. Yan Ke, Rahul Sukthankar, and Martial Hebert. Sep. 2009.*

Grundmann, M., et al., "Auto-Directed Video Stabilization with Robust L1 Optimal Camera Paths", IEEE Conference on Computer Vision and Pattern Recognition (CVPR), 2011, pp. 225-232.

Grundmann, M., et al., "Efficient Hierarchical Graph-Based Video Segmentation", Computer Vision and Pattern Recognition (CVPR), Jun. 2010, pp. 2141-2148.

Anderson, R., A local algorithm for finding dense subgraphs, In Proc. 19th Annual ACM-SIAM Symposium on Discrete Algorithms, 2008, pp. 1003-1009.

Blum, A. et al., "Combining labeled and unlabeled data with co-training," In Proc. 11th Annual Conference on Computational Learning Theory, COLT, Jul. 1998, pp. 92-100.

Davison, B. D., "Topical locality in the web," In Proc. 23rd Annual International ACM SIGIR Conference on Research and Development in Information Retrieval, 2004, pp. 272-279.

Dekel, O., et al., "Large margin hierarchical classification," Proceedings of the 21 st International Conference on Machine Learning, Banff, Canada, 2004, 8 pages.

Deng, J., et al., "ImageNet: A Large-Scale Hierarchical Image Database," IEEE Computer Society Conference on Computer Vision and Pattern Recognition, Jun. 22, 2009, pp. 248-255.

Dumais, S., et al., "Hierarchical classification of web content," In SIGIR '00: Proceedings of the $23^{rd}$ annual international ACM SIGIR conference on Research and development in information retrieval, pp. 256-263, New York, NY, USA, 2000. ACM.

Fan, R.-E., et al., "Liblinear: A library for large linear classification," Journal of Machine Learning Research, 2008, pp. 1871-1874, vol. 9.

Freund, Y., et al., "A decision-theoretic generalization of on-line learning and an application to Boosting," Journal of Computer and System Sciences, 1997, pp. 119-139, vol. 55, article No. SS971504.

Goldman, S., et al., "Enhancing supervised learning with unlabeled data," In Proc. $17^{th}$ International Conference on Machine Learning, 2000, pp. 327-334.

Guillaumin, M., et al., "Multimodal semi-supervised learning for image classification," In Proc. IEEE Conf. Computer Vision and Pattern Recognition, Jun. 2010, pp. 902-909.

Gupta, S., et al., "Watch, listen & learn: Co-training on captioned images and videos," In Proc. ECML PKDD, 2008, Part I, LNAI 5211, pp. 457-472.

Halevy, A., et al., "The unreasonable effectiveness of data," Intelligent Systems, IEEE, Mar. 2009, pp. 8-12, vol. 24, No. 2.

Huang, J., et al., "Exploring web scale language models for search query processing," In Proc. 19th international conference on World wide web, Apr. 26-30, 2010, pp. 451-460.

Koller, D., et al., "Hierarchically classifying documents using very few words," In the Proceedings of the Fourteenth International Conference on Machine Learning, ICML, Jul. 8-12, 1997, pp. 170-178.

Li, L.-J., et al., "Towards total scene understanding: Classification, annotation and segmentation in an automatic framework," In Proc. IEEE Conf. Computer Vision and Pattern Recognition, 2009, pp. 2036-2043.

Li, L.-J., et al., "Optimol: automatic object picture collection via incremental model learning," In Proc. IEEE Conf. Computer Vision and Pattern Recognition, 2007, 8 Pages.

Liu, T.-Y., et al., "Support vector machines classification with a very large-scale taxonomy," In SIGKDD Explorations, 2005, pp. 36-43, vol. 7, Issue 1.

Mahajan, D., et al., "Image classification using the web graph," In Proc. Multimedia, Oct. 25-29, 2010, pp. 991-994.

Neapolitan, R. E., et al., "Learning Bayesian Networks," Prentice-Hall, Inc., Upper Saddle River, NJ, USA, 2003, Cover page and Table of Contents, 7 Pages.

Niebles, J. C., et al., "Extracting moving people from internet videos," In ECCV '08: Proceedings of the 10th European Conference on Computer Vision, 2008, pp. 527-540, Part IV, LNCS 5305.

Schapire, R. E., "The boosting approach to machine learning: An overview," In MSRI Workshop on Non-linear Estimation and Classification, 2002, pp. 1-23.

Schindler, G., et al., Internet video category recognition. In Proc. First IEEE Workshop on Internet Vision, in CVPR, 2008, pp. 1-7.

Song, Y., et al., "Taxonomic classification for web-based videos," In Proc. IEEE Conf. Computer Vision and Pattern Recognition, Jun. 2010, pp. 871-878.

Sun, A., et al., "Hierarchical text classification and evaluation," In ICDM, 2001, pp. 521-528.

Tang, L., et al., "Large scale multi-label classification via metalabeler," In Proc. $18^{th}$ International Conference on World Wide Web, Apr. 20-24, 2009, pp. 211-220.

Wang, Z., et al., "Youtubecat: Learning to categorize wild web videos," In Proc. IEEE Conf. Computer Vision and Pattern Recognition, Jun. 2010, pp. 879-886.

Zanetti, S., et al., "A walk through the web's video clips," In Proc. First IEEE Workshop on Internet Vision, in CVPR, 2008, 8 pages.

Zhu, X., Semi-supervised learning literature survey. In Tech Report. University of Wisconsin—Madison, Jul. 2008, pp. 1-60.

Yan K., et al., "Volumetric Features for Video Event Detection," International Journal of Computer Vision, 2010, pp. 339-362, vol. 88, Issue 3.

Yan K., et al., "Spatio-temporal Shape and Flow Correlation for Action Recognition," Computer Vision and Pattern Recognition, 2007, 8 Pages.

Boyraz, H., et al., "Localizing Actions through Sequential 2D Video Projections," Computer Vision and Pattern Recognition Workshops, Jun. 2011, pp. 34-39.

PCT International Search Report and Written Opinion, PCT/US2012/061925, Mar. 18, 2013, 8 Pages.

Yagnik, J., et al., "Learning people annotation from the web via consistency learning," Proceedings of the international workshop on Workshop on multimedia information retrieval, MIR'07, 2007, pp. 285-290.

\* cited by examiner

|     | $S_1$ | $S_2$ | $S_3$ | $S_4$ | $S_5$ | $S_6$ |
|-----|---|---|---|---|---|---|
| $CV_1$ | 0 | 0 | 0 | 0 | 0 | 1 |
| $CV_2$ | 1 | 1 | 1 | 0 | 0 | 0 |
| $CV_3$ | 0 | 0 | 0 | 1 | 1 | 0 |
| ... |   |   |   |   |   |   |
| $CV_N$ | 0 | 0 | 0 | 0 | 0 | 0 |

*FIG. 5A*

|     | $S_1$ | $S_2$ | $S_3$ | $S_4$ | $S_5$ | $S_6$ |
|-----|------|-----|-----|------|------|-----|
| $CV_1$ | 0.1 | 0 | 0 | 0 | 0 | 0.9 |
| $CV_2$ | 0.85 | 0.9 | 0.8 | 0.15 | 0.2 | 0 |
| $CV_3$ | 0 | 0.1 | 0.2 | 0.85 | 0.8 | 0 |
| ... |   |   |   |   |   |   |
| $CV_N$ | 0.05 | 0 | 0 | 0 | 0 | 0.1 |

*FIG. 5B*

| Before | $CV_1$ | $CV_2$ | $CV_3$ | ... | $CV_N$ |
|--------|---|---|---|---|---|
| $CV_1$ | 0 | 0 | 0 |   | 0 |
| $CV_2$ | 3 | 0 | 6 |   | 0 |
| $CV_3$ | 2 | 0 | 0 |   | 0 |
| ... |   |   |   |   |   |
| $CV_N$ | 0 | 0 | 0 |   | 0 |

*FIG. 5C*

| before-Q | $CV_1$ | $CV_2$ | $CV_3$ | ... | $CV_N$ |
|---|---|---|---|---|---|
| $CV_1$ | 1,0,0 | 1,0,0 | 1,0,0 | | 1,0,0 |
| $CV_2$ | 0,1,0 | 1,0,0 | 0,1,0 | | 1,0,0 |
| $CV_3$ | 1,0,0 | 1,0,0 | 1,0,0 | | 1,0,0 |
| ... | | | | | |
| $CV_N$ | 1,0,0 | 1,0,0 | 1,0,0 | | 1,0,0 |

*FIG. 5D*

HIGH-CONFIDENCE LABELING OF VIDEO VOLUMES IN A VIDEO SHARING SERVICE

CROSS REFERENCE TO RELATED APPLICATIONS

The application claims the benefit of Provisional Application No. 61/556,059, filed on Nov. 4, 2011, which is hereby incorporated herein by reference.

BACKGROUND

1. Field of Art

The present disclosure generally relates to the field of digital video, and more specifically, to labeling temporal and spatial portions of videos that represent particular objects or actions.

2. Background of the Disclosure

A typical digital video depicts multiple semantic objects or actions, such as animals, vehicles, stationary objects, and the like. Existing video analysis techniques permit some degree of automated labeling of a video as a whole, such as determining that the video as a whole depicts a particular animal or type of vehicle. However, existing techniques do not adequately support the identification of particular video segments, and the particular spatial regions within those video segments, that represent a particular object or action, without preexisting indications of the meanings of different video segments.

SUMMARY

In one embodiment, a computer-implemented method comprises identifying, in a plurality of digital videos, a plurality of candidate volumes representing spatio-temporal segments of the digital videos, wherein each of the candidate volumes corresponds to a contiguous sequence of spatial portions of the video frames having a starting time and an ending time, and potentially represents a discrete object or action within the video frames. The method further comprises determining, for each of the identified candidate volumes, features characterizing the candidate volume, wherein the features are determined from visual properties of the spatial portions of the video frames contained in the candidate volumes, and assigning a verified label to each volume of a plurality of the identified candidate volumes using the determined features, the verified label indicating a particular object or action represented by the volume to which the label is assigned.

In one embodiment, a computer-readable storage medium has executable computer program instructions embodied therein, actions of the computer program comprising identifying, in a plurality of digital videos, a plurality of candidate volumes representing spatio-temporal segments of the digital videos, wherein each of the candidate volumes corresponds to a contiguous sequence of spatial portions of the video frames having a starting time and an ending time, and potentially represents a discrete object or action within the video frames. The actions further comprise determining, for each of the identified candidate volumes, features characterizing the candidate volume, wherein the features are determined from visual properties of the spatial portions of the video frames contained in the candidate volumes, and assigning a verified label to each volume of a plurality of the identified candidate volumes using the determined features, the verified label indicating a particular object or action represented by the volume to which the label is assigned.

In one embodiment, a computer system comprises a computer processor and a computer-readable storage medium having executable computer program instructions embodied therein. When executed by the computer processor the instructions perform actions comprising identifying, in a plurality of digital videos, a plurality of candidate volumes representing spatio-temporal segments of the digital videos, wherein each of the candidate volumes corresponds to a contiguous sequence of spatial portions of the video frames having a starting time and an ending time, and potentially represents a discrete object or action within the video frames. The actions further comprise determining, for each of the identified candidate volumes, features characterizing the candidate volume, wherein the features are determined from visual properties of the spatial portions of the video frames contained in the candidate volumes, and assigning a verified label to each volume of a plurality of the identified candidate volumes using the determined features, the verified label indicating a particular object or action represented by the volume to which the label is assigned.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIGS. 5A-5E provide different examples of geometric features for characterizing video volumes, according to some embodiments.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Architecture

Figure 1:
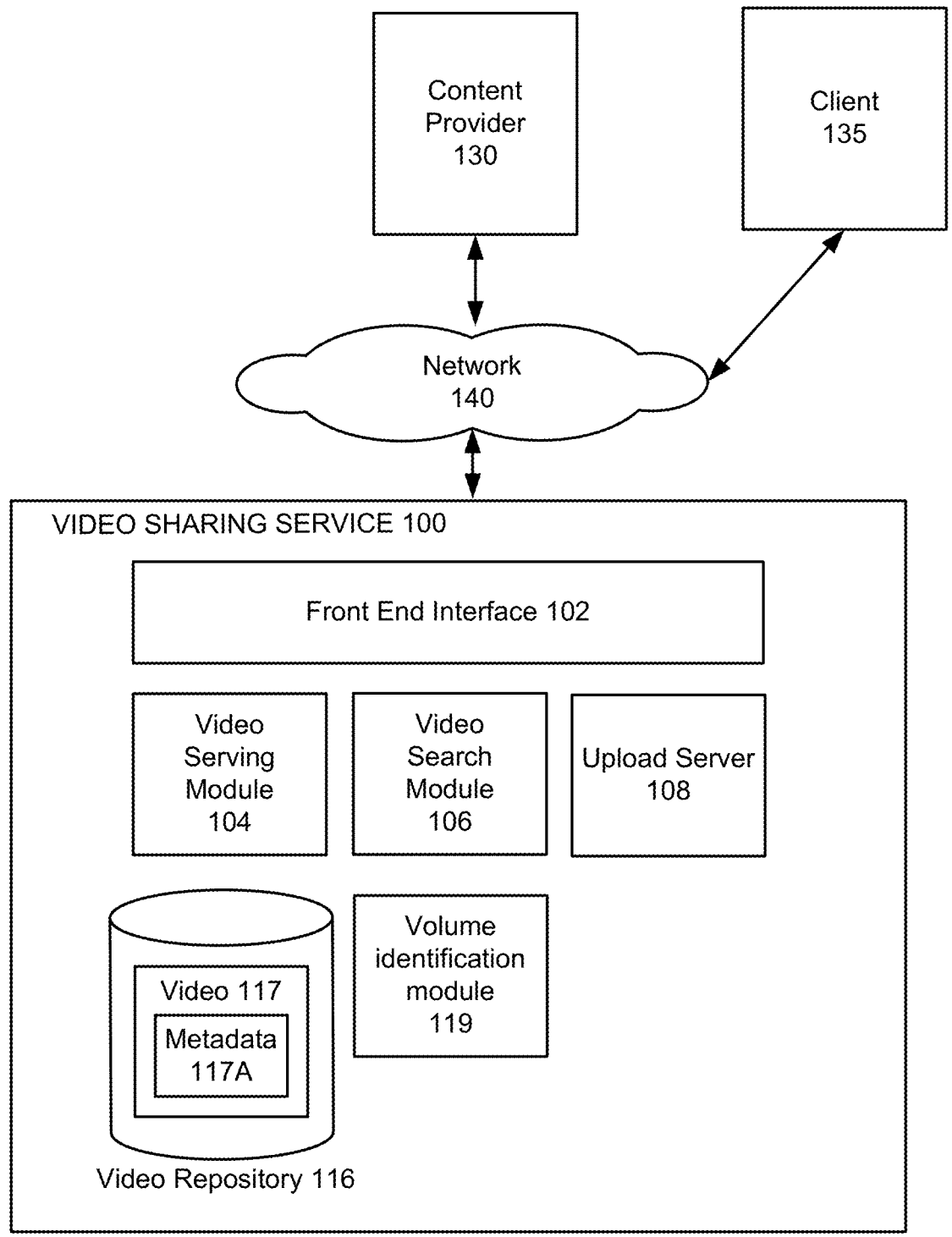
FIG. 1 is a block diagram of a video hosting service in which video volume labeling takes place, according to one embodiment.

FIG. 1 is a block diagram of an example video hosting service 100 in which video volumes can be analyzed and labeled, according to one embodiment. The video hosting service 100 represents a system such as that of YOUTUBE that stores videos provided by content providers 130 and makes the videos available to clients such as the client device 135. The video hosting service 100 thus communicates with a plurality of content providers 130 and client devices 135 via a network 140 to facilitate sharing of video content between users. Note that for the sake of clarity FIG. 1 depicts only one instance of content provider 130 and client device 135, though there could be any number of each.

The video hosting service 100 additionally includes a front end interface 102, a video serving module 104, a video search module 106, an upload server 108, and a video repository 116. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE website, found at www.youtube.com. Other video hosting sites are known, as well, and can be adapted to operate according to the teachings disclosed herein. The illustrated components of the video hosting service 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting service 100 can also be performed by one or more clients 135 in other embodiments if appropriate.

Client devices 135 are computing devices that execute client software, e.g., a web browser or built-in client application, to connect to the front end interface 102 of the video hosting service 100 via a network 140 and to display videos. The client device 135 might be, for example, a personal computer, a personal digital assistant, a smart phone, a laptop computer, a television "set-top box," and the like.

Conceptually, the content provider 130 provides video content to the video hosting service 100 and the client 135 views that content. In practice, content providers may also be content viewers. Additionally, the content provider 130 may be the same entity that operates the video hosting service 100.

The content provider 130 operates a client device to perform various content provider functions. Content provider functions may include, for example, uploading a video file to the video hosting service 100, editing a video file stored by the video hosting service 100, or editing content provider preferences associated with a video file.

The client 135 operates on a device to view video content stored by the video hosting service 100. Client 135 may also be used to configure viewer preferences related to video content. In some embodiments, the client 135 includes an embedded video player such as, for example, the FLASH player from Adobe Systems, Inc. or any other player adapted for the video file formats used in the video hosting service 100. Note that the terms "client" and "content provider" as used herein may refer to software providing client and content providing functionality, to hardware on which the software executes, or to the entities operating the software and/or hardware, as is apparent from the context in which the terms are used.

The upload server 108 of the video hosting service 100 receives video content from a client 135. Received content is stored in the video repository 116. In response to requests from clients 135, a video serving module 104 provides video data from the video repository 116 to the clients 135. Clients 135 may also search for videos of interest stored in the video repository 116 using a video search module 106, such as by entering textual queries containing keywords of interest. Front end interface 102 provides the interface between client 135 and the various components of the video hosting service 100.

The video repository 116 contains a set of videos 117 submitted by content providers 130. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4/H.264, WMV, WebM, and the like. Further, in addition to their audiovisual content, the videos 117 may—but need not—have associated video-level metadata 117A that corresponds to the video as a whole, e.g., textual metadata such as a title, description, and/or tags provided by a content provider 130 who uploaded the video. Various approaches may be used to extract semantically meaningful labels (e.g., "cat", "dog", "yarn", "running", "running cat") from the metadata 117, such forming n-grams comprising some number of adjacent words from the metadata.

The video hosting service 100 further comprises a volume identification module 119 that analyzes the videos 117 and assigns labels to "volumes" located within the videos. More specifically, the volume identification module 119 identifies unlabeled volumes in the videos 117, determines features representative of those volumes, and through analysis of these features then assigns semantically meaningful labels to the volumes. This process is depicted in more detail in FIG. 3, described below. Volumes are described with reference to FIG. 2.

Figure 2:
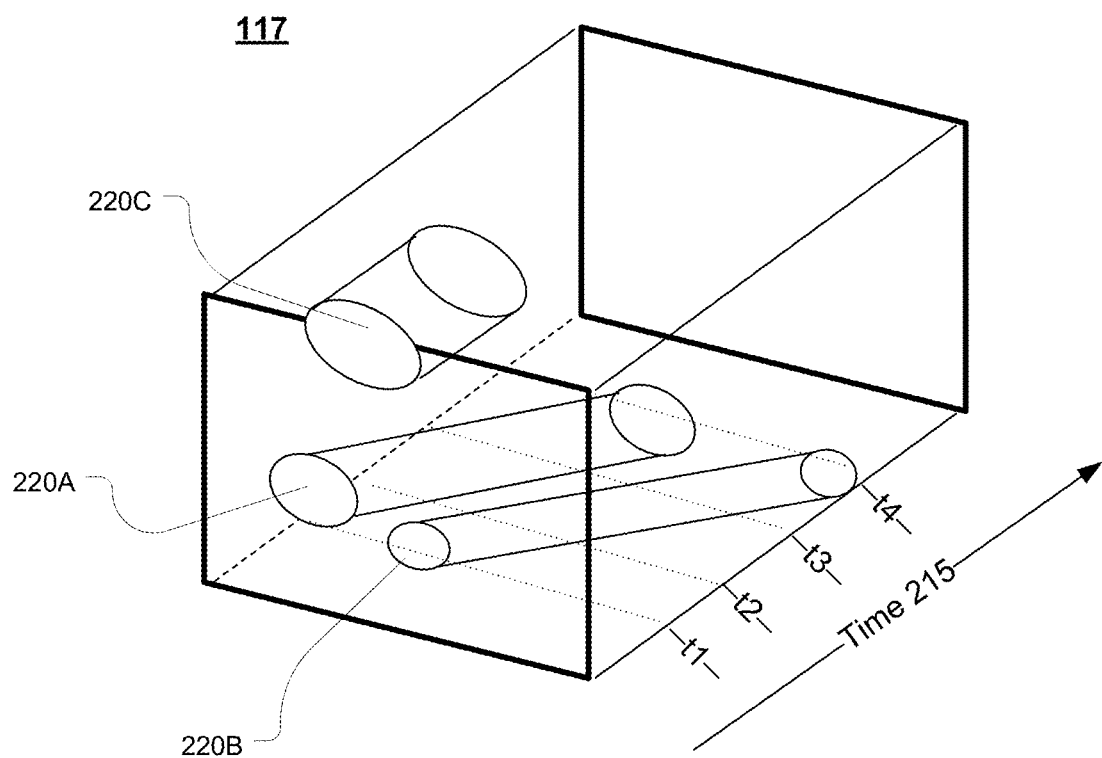
FIG. 2 illustrates an example video and its constituent video volumes.

FIG. 2 illustrates an example video 117 and some of its constituent video "volumes." Each video volume corresponds to a spatial portion of pixels extending over a temporally contiguous sequence of frames and has a starting time and an ending time with respect to the video of which it is a part. A given volume may representing a subset of the video in which it is located both temporally (i.e., it begins at some time later than the start of the video and/or ends at some time before the end of the video) and spatially (i.e., at least one of the spatial portions corresponding to one of the frames occupies less than the entire frame). Some of the volumes can be associated with a semantically meaningful object or action, such as a face, an animal, a vehicle, a gesture, a movement, an event (e.g., car accident, handshake, kiss), and the like, while other volumes may not correspond to a semantically meaningful object, but rather to a portion thereof. The example video 117 contains a number of frames (not depicted) arranged sequentially in a temporal order illustrated by the timeline 215. The example video 117 contains a first video volume 220A, a second video volume 220B, and a third video volume 220C. These volumes might represent, for example, a cat 220A chasing a ball of yarn 220B, while a dog 220C sits motionless and observes. In each frame, a volume occupies a substantially contiguous region of pixels. The spatial positions of the volumes within the individual video frames can, but need not, change over time. For example, the volumes 220A and 220B move from left to right over the course of the video, e.g., as the cat chases the ball of yarn. Additionally, the size of the spatial portion of a video frame occupied by a given volume may vary over time. For example, the object or action corresponding to the given volume may come closer to the camera over time, in which case the amount of the frames occupied by the volume will become correspondingly larger. Similarly, if an object changes its shape—e.g., the sitting dog 220C stands up—the shape of the volume may change over time, as well. Volumes can start and end at different times within a video. For example, volumes 220A and 220B both start at the first frame $t_1$ and end near frame $t_4$, while volume 220C starts later at frame $t_2$, and ends earlier at around frame $t_3$.

Volumes need not correspond to a rigid object. Rather, a volume may represent an object that can change its shape, such as an articulated creature such as a dog that can move its limbs to shift from a sitting position to a standing position. A volume may also change its shape over time even in the case of a rigid object, such as if the camera changes position to capture a different angle of the same object. Further, a volume need not represent a single physical object, such as an entire human, but can represent an action made up of movements, such as sign language made by the motions of a human hand. A volume for an action may also correspond to the same spatio-temporal region as the volume for an object, such as a volume representing both a physical cat object and an action representing the concept of running, or a volume for a physical ball of yarn object and an action representing the concept of rolling.

The disclosed system provides various methods and means for automatically identifying volumes in videos and automatically assigning semantically meaningful labels, all without direct human selection of the volumes or the labels.

Figure 3:
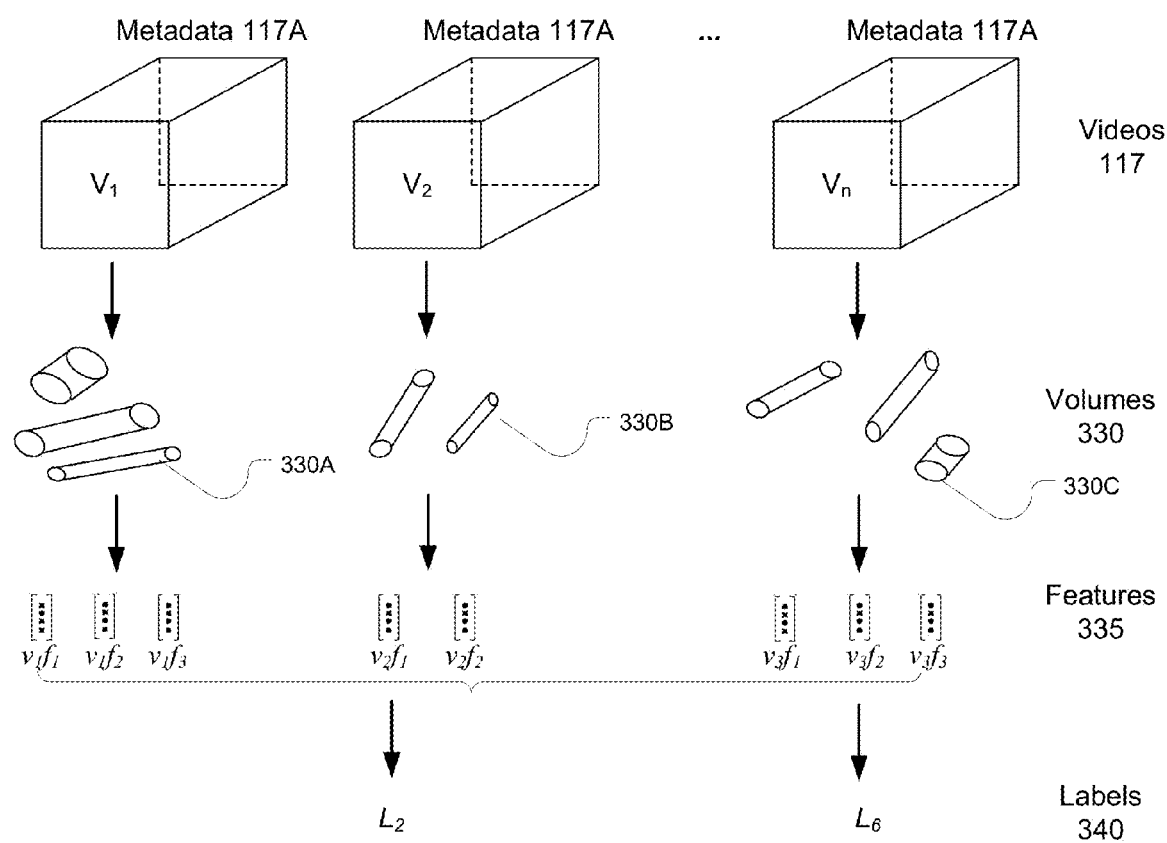
FIG. 3 is a data flow diagram representing the relationships and derivations of the various types of data analyzed, produced, and/or applied by the volume identification module, according to one embodiment.

FIG. 3 is a data flow diagram representing the relationships and derivations of the various types of data analyzed, produced, and/or applied by the volume identification module 119, according to one embodiment.

The volume identification module 119 takes, as input, the videos 117 from the video repository 116 of FIG. 1. A typical digital video includes multiple volumes. For example, a video as described in FIG. 2 (depicting a cat playing with a ball of yarn and later being joined by a dog that sits and watches) could be described as containing at least three volumes: one volume corresponding to the cat, another volume corresponding to the ball of yarn, and another volume corresponding to the dog. Each of these volumes occupies a particular temporal portion of the video corresponding to the portion in which the volume's object is shown in the video. Likewise, each of the volumes has, at every frame, a spatial portion that it occupies, and the spatial portion may change in size, shape, and position over time.

The volume identification module 119 extracts from each of the videos 117 a set of volumes 330 based on the visual content of the video. For example, FIG. 3 illustrates three volumes 330A extracted from the first video (e.g., the cat, ball of yarn, and dog of FIG. 2), two volumes 330B extracted from the second video, and three volumes 330C extracted from the third video. At this stage, the extracted volumes are unlabeled, in that although volume identification module 119 has determined that each volume potentially represents a single semantically meaningful object or action, it is not yet determined what those objects or actions are. That is, although a particular volume may in fact visually represent a dog, to the volume identification module 119 the volume is only a set of data, without any semantic meaning yet determined. These unlabeled volumes act as the candidates from which volumes capable of being accurately labeled are later selected, and are hence referred to hereinafter as "candidate volumes."

The volume identification module 119 then determines, for each candidate volume 330, a set of features 335 that characterize the visual characteristics of the candidate volume as a whole. Different embodiments extract different types of features that are effective for characterizing volumes. In one embodiment, one feature vector is extracted for each volume. Thus, for the three volumes 330A for video $V_1$, there are three corresponding feature vectors $v_1f_1$, $v_1f_2$, and $v_1f_3$. The same applies to the other videos $V_2$ and $V_3$ and their respective volumes 330B and 330C. In other embodiments, each volume may have a number of associated feature vectors, one for each different type of feature.

The volume identification module 119 then analyzes the determined features to select certain ones of the volumes 330 that can be identified with high confidence as having a certain label. A label 340 is then applied to the selected videos based on the identification. In the example of FIG. 3, for instance, only the first one of the volumes of video $V_2$, and the second one of the volumes of the video $V_3$, are able to be identified with sufficiently high certainty and thus assigned a label—namely, $L_2$ and $L_6$, respectively, where $L_2$ and $L_6$ are labels from some previously determined set of possible labels. Again, this assignment happens automatically, without direct human selection of the volumes or of the labels.

Different embodiments apply different approaches to volume identification. For example, in some embodiments volume identification involves analyzing feature vector consistency by clustering the volumes (or, more precisely, their corresponding feature vectors) and determining a degree of consistency of the user-specified labels within each cluster. In other embodiments, volume identification involves training and applying weak volume classifiers based on user-specified labels. These techniques are explained further below with respect to a volume labeling module 415 of FIG. 4.

Figure 4:
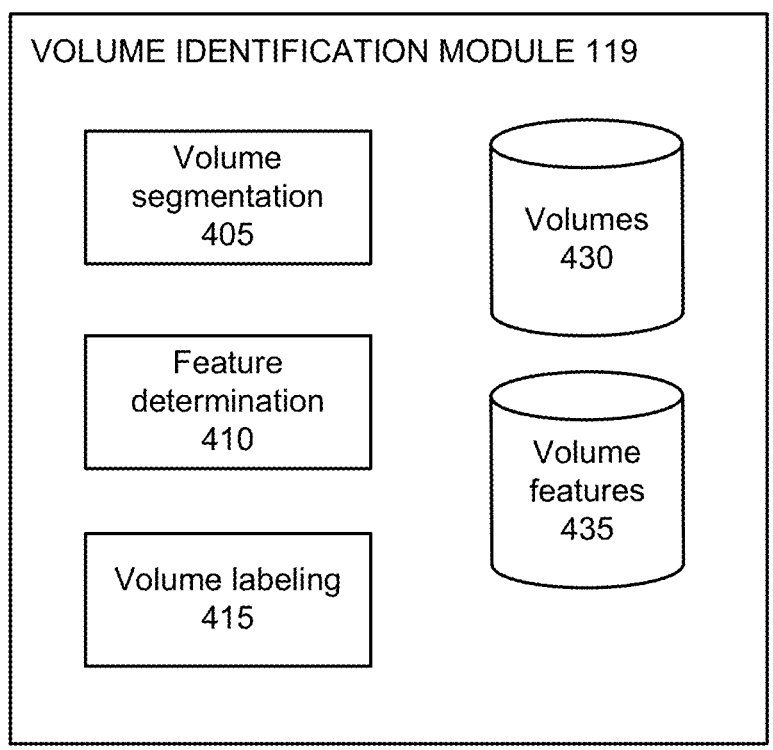
FIG. 4 illustrates the various components of the volume identification module of FIG. 1, according to one embodiment.

FIG. 4 illustrates the various components of the volume identification module of FIG. 1, according to one embodiment. More specifically, the volume identification module 119 comprises a volume segmentation module 405 that extracts unlabeled candidate volumes from each of the videos 117 by applying image segmentation algorithms to the video; a feature determination module 410 that determines, for each of these candidate volumes, features that describe the visual characteristics of the volume; and a volume labeling module that uses the determined volume features to label volumes with high confidence. The video identification module 119 generally operates over a large set of videos 117, processing thousands, and potentially millions, of videos.

I. Volume Segmentation

In one embodiment, the volume segmentation module 405 first identifies stable segments of the video and then extracts candidate volumes from the stable segments, and is one means for performing this function. The videos are first stabilized with a video stabilization algorithm, which reduces the effects of camera motion and shake typically found in amateur videos. One approach to video stabilization is described in the article "Auto-Directed Video Stabilization with Robust L1 Optimal Camera Paths", by Matthias Grundmann, Vivek Kwatra, and Irfan Essa, in "IEEE Conference on Computer Vision and Pattern Recognition (CVPR)", 2011, which is incorporated by reference herein (including all of the references cited therein).

For a given video, the stabilization algorithm outputs stabilized video as a well as a measure of the degree of background motion in each frame of the video. This measure of the background motion is used to identify series of frames where the background is motionless, thereby indicating that the camera is not moving, and that any motion in the frame is due to motion of a foreground object. Sequences of frames where there is no background motion are identified as stable segments.

Given the stable segment(s) in a video, individual volumes are extracted therefrom. For candidate volume extraction, in one embodiment the volume segmentation module 405 applies hierarchical graph-based video segmentation to the stable regions of a given video. This approach over-segments a volumetric video graph into space-time regions grouped by appearance, constructs a "region graph" over the obtained stable segments, and iteratively repeats the process over multiple levels to create a tree of spatio-temporal segmentations. Additional details on such an approach are described in the article "Efficient Hierarchical Graph-Based Video Segmentation", by Matthias Grundmann, Vivek Kwatra, Mei Han, and Irfan Essa, in "Computer Vision and Pattern Recognition (CVPR)", June 2010, pages 2141-2148, which is incorporated by reference herein (including all of the references cited therein).

As a result of the operations of the volume segmentation module 405, a volumes repository 430 contains a set of descriptions of all unlabeled candidate volumes segmented from all videos 117 being processed. Each volume is described by a set of data including: (1) an identifier of the video containing the volume; and (2) the temporal and spatial portion of the video that the volume occupies. The temporal portion of a volume can be described by a list of frame numbers, and the spatial portion can be a list of spatial descriptors, such as one spatial descriptor per frame. Each spatial descriptor indicates the portion of the frame occupied by the volume, and can be (for example), a list of pixels, a bounding box (e.g., the top-left and bottom-right coordinates of a rectangle), or a list of coordinate pairs forming a polygon, that encloses the volume at that frame.

II. Feature Determination

With the candidate volumes identified by the volume segmentation module 405, a feature determination module 410 determines, for each of these volumes, features that describe the visual characteristics of the volume. Different approaches are employed in different embodiments, as is now described.

(A) Volume Average Features

Generally, the feature determination module 410 first generates a codebook of features commonly found in videos, and then uses that codebook as the basis for identifying the features for each video.

(i) Codebook Generation

More specifically, to generate the codebook the feature determination module 410 divides every volume of every video into sequential fixed-length segments, such as segments of one second duration. Thus, for example, if a volume in a given video lasts 30 seconds, then 30 one second segments are created. Each segment will contain the data for some number of frames, depending on the number of frames per second. Alternatively, the segments can be a fixed number of frames, rather than a fixed time duration. For each such segment, the feature determination module 410 extracts a representative feature vector—or a set of feature vectors, one for each of the different types of features—that describes the visual properties of the segment.

The visual property features of the feature vector for the segments may include, for example, features sampled using a Laplacian-of-Gaussian (LoG) or Scale Invariant Feature Transform (SIFT) feature extractor, a color histogram computed using hue and saturation in HSV color space, motion rigidity features, texture features, filter responses (e.g., derived from Gabor wavelets), including 3D filter responses, or edge features using edges detected by a Canny edge detector. Other types of visual features would be known to one of skill in the art and may be used as well, such as feature descriptors including GLOH (Gradient Location and Orientation Histogram), LESH (Local Energy based Shape Histogram), HOG (Histogram of Oriented Gradients), or SURF (Speeded Up Robust Features) features. Regardless of the particular features used, the features are concatenated into a single, compound high dimensional segment feature vector. Thus, for every volume of every video, there will be a set of segment feature vectors, one feature vector per segment.

The feature determination module 410 then clusters the segment feature vectors using an algorithm such as k-means clustering with random initialization of k cluster centers ($k \approx 100$), and for each resulting cluster forms a representative feature vector, such as the centroid of the cluster. (In embodiments in which each feature type has a separate feature vector, rather than using a single compound feature vector, a separate codebook can be formed for each type from the feature vectors for that type. Thus, in such embodiments there could be a codebook for pixel color, with entries such as <67, 125, 0> representing a color with a red component of 67, a green component of 125, and a blue component of 0; a separate codebook for texture; a separate codebook for motion rigidity; and the like.) The set of k cluster feature vectors together form the basis of the code book, where each cluster feature vector represents one code vector entry in the codebook, and is referenced using an integer index into the codebook, or a logical "true" in a bit vector at a position corresponding to that code vector. Other variations on the representation of the codebook(s) would be known to one of skill in the art.

There are a number of different ways of representing a given video volume based on the feature codebook(s), as are described in the following sections.

(ii) Determining Volume Average Feature Vectors

The feature determination module 410 represents the features for a volume 330 in terms of the feature codebook, thus providing a form of vector quantization and data dimensionality reduction. Specifically, the feature determination module 410 divides a given volume into one second segments and extracts a feature vector (or set of feature vectors, one per feature type) in the same manner used when creating the codebook. Then, in one embodiment, the feature vector is mapped to a single most similar codebook entry according to some similarity function.

In other embodiments, rather than mapping the feature vector as a whole, individual elements of the feature vector for a segment are mapped to most similar codebook entries according to some similarity function. This results in a histogram of codebook entries for that segment. For example, in one embodiment the feature vector for a segment includes color features for various pixels of interest, such as color values for each pixel; each pixel color value feature is mapped to a most similar codebook entry; and a histogram is created for the different codebook entries. For instance, a pixel color value feature <64, 128, 0> might be mapped to codebook entry <67, 125, 0> with codebook index 3, and a different pixel color value feature <70, 130, 5> might also be mapped to the same codebook entry <67, 125, 0>. A different pixel color value feature <120, 33, 80> might map to a different codebook entry <121, 35, 80> with codebook index 8. Thus, based at least on these three pixel color values, the histogram for pixel color value would contain at least two entries for index 3, and one for index 8. The different resulting histograms could in turn be clustered into a secondary histogram codebook, similar to the codebook creation process described above; thus, different distinct histograms would have different histogram codebook indexes. These codebook entry histograms—e.g., one for pixel color values, one for texture, etc.—then represent the segment, and also conjointly represent the volume of which the segment is a part.

In one embodiment, the codebook entries (whether histograms in one embodiment, or a single non-histogram code vector in another embodiment) for the different types of features are concatenated into a single feature vector for the segment; in other embodiments, each type remains separate and is separately analyzed and processed.

For example, FIG. 5A depicts an example of a volume temporally partitioned into six segments (and having six feature vectors, $S_1$ to $S_6$, one per segment), along with a codebook of N code vectors CV. (In embodiments in which different types of features such as pixel color value features, and texture features, remain separate, for a given segment there is a separate set of feature vectors for each feature type.) In this example, the feature vectors for the first three segments $S_1$, $S_2$, and $S_3$ are most similar to the second code vector (denoted "$CV_2$"), whereas the feature vectors for the fourth and fifth segments $S_4$ and $S_5$ are most similar to the third code vector ("$CV_3$"). The last segment $S_6$ has a feature vector most similar to $CV_1$. As can be observed, in the example of FIG. 5A, a given segment can now be represented as one-hot bit vector (reading down the column from the segment number), with a single bit set corresponding to the code vector that is most similar to the segment's feature vector. Thus, the first segment $S_1$ has a feature vector of [0, 1, 0, . . . , 0], for example.

As an alternative representation, the feature vector for each segment may have its similarity to each code vector computed and stored as a normalized real number (a similarity or correspondence score). This embodiment is depicted in FIG. 5B, in which the first segment $S_1$ has a correspondence of 0.1 (on a scale of 0.0 to 1.0, from least to most similar) to code vector $CV_1$, a correspondence of 0.85 to code vector $CV_2$, a correspondence of 0.0 to code vector $CV_3$, and so on.

Since each volume can have a different length in terms of the number of segments, and hence a different number of feature vectors, the feature vectors are normalized by summing their values and dividing the sum vector by the number of feature vectors, thereby obtaining an averaged feature vector for a given volume.

Referring to the example of FIG. 5A, for instance, the summed feature vector for the volume is

[0,1,0, . . . ,0]+[0,1,0, . . . ,0]+[0,1,0, . . . ,0]+
[0,0,1, . . . ,0]+[0,0,1, . . . ,0]+[1,0,0, . . . ,0]=[1,3,
2, . . . ,0]

and the volume average feature vector is

[1,3,2, . . . ,0]/5=[0.2,0.6,0.4, . . . ,0]

The volume average feature vector for the example of FIG. 5B would be computed in the same way.

(B) Geometric Representation

In another embodiment, the feature determination module 410 calculates geometric features representing the relationships of different code vectors over time and/or space. Such features permit geometric reasoning in both time and space.

(i) Time Relationships

Time relationship features—such as "before", "after", and "at the same time"—quantify the degree to which one code vector occurs before another code vector within a given segment. It is understood that saying a code vector appears "before" or "after" another code vector in a given segment means that the underlying feature vectors which were mapped to the corresponding code vectors themselves appeared in a particular temporal order, since the code vectors themselves are being used as proxies for the underlying feature vectors. For example, a "before" binary operator quantifies the total number of times each instance of a first code vector $CV_i$ occurs before each instance of a second code vector $CV_j$ in a given segment. Referring back to the example of FIG. 5A, each of the three instances of code vector $CV_2$ (in $S_1$, $S_2$, and $S_3$) occurs before each of the two instances of code vector $CV_3$ (in $S_4$ and $S_5$), and hence the result of the expression "$CV_2$ before $CV_3$" is 3*2=6. Similarly, the result of the expression "$CV_3$ before $CV_1$" is 2, since both occurrences of $CV_3$ occur before the one occurrence of $CV_1$. Hence, for the example of FIG. 5A, the features for the temporal operator "before" form a temporal relationship matrix as shown in FIG. 5C, where the cell at row $CV_i$, column $CV_j$ indicates the value of the expression "$CV_i$ before $CV_j$".

Likewise, the operator "after" can be defined in similar fashion to quantify how many times an instance of one code vector occurs after an instance of another code vector, thus producing a corresponding temporal relationship matrix.

(ii) Spatial Relationships

Spatial relationship features—such as "left-of", "right-of", "above", "below", and "centered-on"—quantify the degree to which one code vector occurs at a given spatial position in a frame relative to another code vector. For example, an "above" binary operator quantifies how many times a first code vector $CV_i$ occurs above (closer to the top of the frame) the first occurrence of a second code vector $CV_j$.

In one embodiment, the spatial position of a code vector of a segment is defined to be the spatial position of the centroid of the segment at that moment in time. The centroid of a segment can be further defined in terms of the centroids of the segment portions for each frame within the segment. That is, for each frame within the segment, the spatial portion of the segment is determined, and the centroid of that portion identified, e.g., as the center of a rectangular region bounding the spatial portion. Then, the x coordinates of the centroids are summed and averaged over the frames of the segment, as are the y coordinates, with the average x coordinate and the average y coordinate constituting the location of the centroid of the segment.

As an example, if a given volume has a segment $S_1$ with a centroid at position (10, 10) and a corresponding code vector $CV_1$, and a second segment $S_2$ with a centroid at position (20, 30) and a corresponding code vector $CV_2$, then the relationship "$CV_1$ left-of $CV_2$" holds in that instance, since $S_1$ is located to the left of $S_2$ (x-coordinate 10 of $S_1$ is less than x-coordinate 20 of $S_2$). Other comparisons would be computed in a similar manner, and the values aggregated in a manner similar to that depicted in FIG. 5C, for example.

In another embodiment, the spatial comparisons are not between feature vectors of different segments, but rather between feature vectors corresponding to different points of the same segment. For example, points or regions of interest (e.g., points of color discontinuities) can be selected within a given frame, or different frames of the same segment, and a feature vector selected for each using the same feature selection as described above, and each feature vector mapped to appropriate codebook entries, as also described above. Thus, for example, if a first point had a feature vector $CV_1$ and a second point had a feature vector $CV_2$, and the first point were located to the left of the second point, then "$CV_1$ left-of $CV_2$" would be true for that point, and other point pairs would likewise be compared to achieve the total count for the relationship "$CV_1$ left-of $CV_2$" for that segment, resulting in a matrix similar to that depicted in FIG. 5C.

(iii) Combined Relationships

Spatial and temporal relationships can be combined into spatial-temporal relationships, such as "left-of-and-before", or "above-and-after." For example, the "before-and-left-of" relationship quantifies how many times a first code vector $CV_i$ occurs both before and to the left of the first occurrence of a second code vector $CV_j$.

Certain additional relationships can be defined when temporal and spatial relationships are combined. For example, an "at the same time" temporal relationship operator can be defined and used in combination with the spatial relationships set forth above. Thus, one combined operator "above-and-at-the-same-time" could indicate whether a particular code vector $CV_i$ occurs both above and at the same time as another code vector $CV_j$.

It is appreciated that the above sets forth one example set of different relationships in time and space, and that other sets could be used in different embodiments, including defining fewer or different relationships.

It is further appreciated that each of the relationship feature matrices, such as the "before" matrix of FIG. 5C and the "left-of" matrix of 5E, could be expressed as a vector (e.g., a vector of column vectors), and that all the relationship features could be combined into a single vector by concatenating the feature matrices (equivalently, vectors) for each of the relationships. Thus, for example, each volume can be assigned a compound geometric vector comprising features corresponding to temporal relationships such as "before", "after", "at the same time", spatial relationships such as "left-of", "right-of", "above", "below", "centered-on", and all combinations of the temporal and spatial relationships.

(C) Quantization

In one embodiment, a variation of the geometric representation is employed. More specifically, each of the elements in each of the relationship matrices is quantized into a predefined set of value ranges, resulting in a bit vector for each element. For example, the value of each element could be mapped into the three value ranges "0 to 2", "3 to 12", and "12 or more." The results of this quantization for FIG. 5C is illustrated in FIG. 5D, for instance. For example, the element at row $CV_2$, column $CV_1$ has been quantized to the bit vector <0,1,0>, indicating that the value 3 is within the second of the three value ranges.

Reducing the specific values of the matrix elements to binary vectors enhances the ability to do further analysis using algorithms such as frequent item set mining. As a result of the application of further analysis, higher-order conjunctions of geometric representations leading to strong geometric features can be defined. For example, for a volume representing a car, a pattern such as <$CV_1$, $CV_2$, <0,1,0>>, <$CV_2$, $CV_4$, <1,0,0>>, <$CV_1$, $CV_3$, <1,0,0>, <$CV_1$, $CV_4$, <0,0,1>> might be observed to occur with some degree of frequency for the "above" spatial relationship, indicating that (for instance) tires tend to be below windshields and below doors, that windshields tend to be above doors, or the like. The discovery of such higher-order features can make later object-level analysis easier.

Regardless of the particular types of volume features employed, the features for a volume are stored in a volume features repository 435 in association with the unique identifier of the volume to which the features correspond. It is appreciated that the volumes repository 430 and the volume features repository 435, although depicted in FIG. 4 as being logically separate repositories, could be physically combined within a single repository.

III. Volume Labeling

With features—such as volume average features, and/or geometric features—associated with each of the candidate volumes, a volume labeling module 415 applies the features to label with high accuracy certain ones of the candidate volumes stored in the volumes repository 430. (Note that supervised learning cannot be directly employed to do the volume labeling, since individual candidate volumes have not been labeled by users and hence training sets cannot easily be formed. Rather, the applicable labels are discovered by analysis of the relationship between the features characterizing the volumes, and labels previously applied to the videos, e.g., by users as part of the video metadata 117A.) Different approaches are employed in different embodiments, as is now described.

(A) Clustering By Features

In one embodiment, each volume is preliminarily labeled with the label(s) derived from textual metadata of the video of which the volume is a part, such as the video title, description, or tags. For example, if video metadata 117A of the example video of FIG. 2 yielded the labels "dog", "running", and "cat", then each of the three volumes 220A-C is associated with all three of these labels. Volumes of videos lacking any labels are excluded from further processing.

The volume labeling module 415 clusters the volumes in the volumes repository 430 (or equivalently, their corresponding feature vectors) according to the values of their feature vectors assigned by the feature determination module 410. For example, k-means clustering can be employed, with k randomly-selected volume vectors initialized as the k initial volume cluster seeds. This results in k clusters of volumes with similar visual characteristics. Some of the clusters may represent semantically meaningful volumes, but others may not. Which clusters are likely to be related to a semantically meaningful volume is determined by analysis of consistency of the preliminary labels of the volumes.

Figure 6:
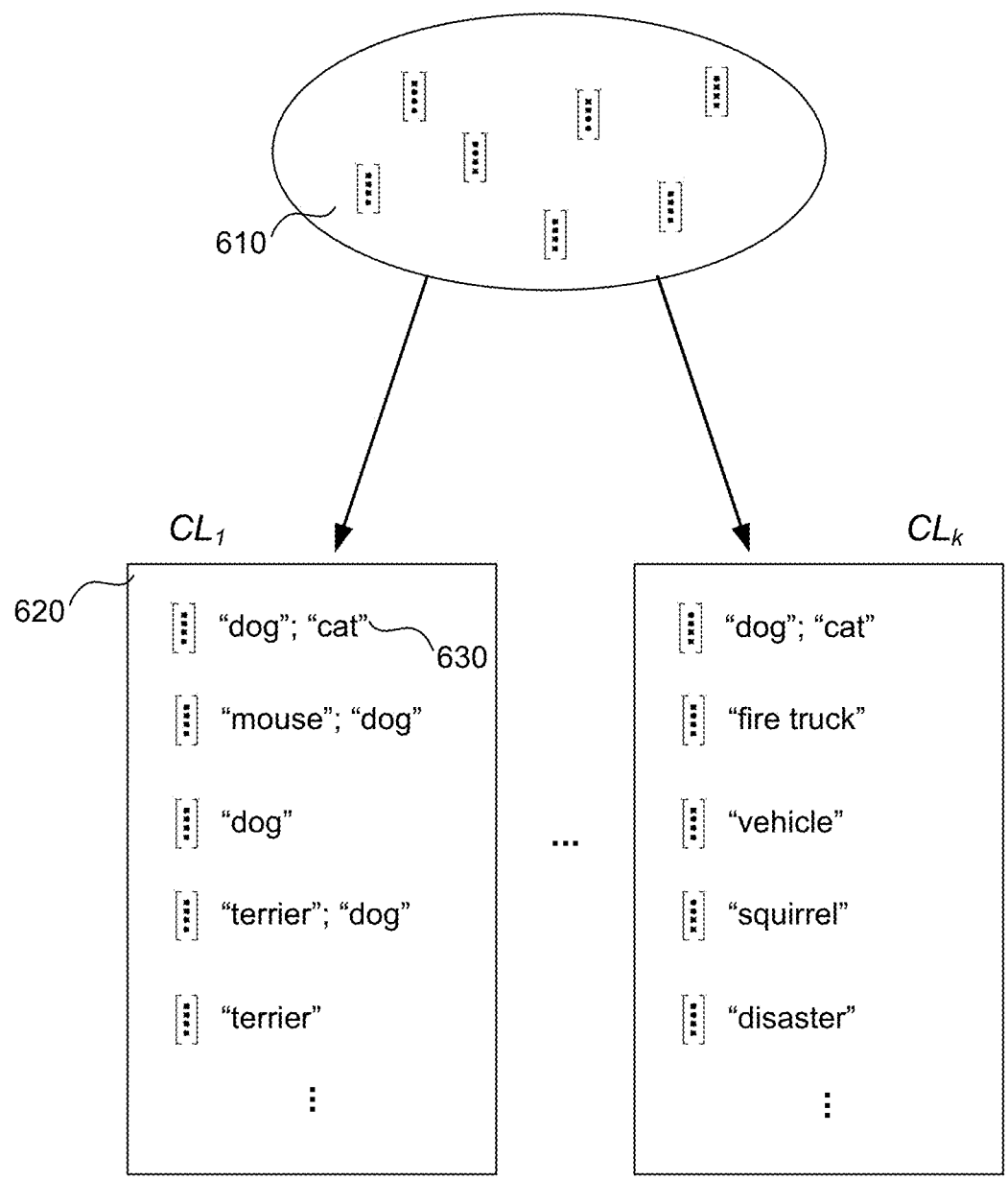
FIG. 6 illustrates clustering by features, one technique for volume labeling, according to one embodiment.

For example, FIG. 6 illustrates an initial set 610 of the videos 117 before clustering. Clustering results in k clusters 620, $CL_1$ to $CL_k$, each having some subset of the videos (equivalently, video feature vectors) in the set 610 that were determined to be similar.

As noted above, each volume is preliminarily labeled with the labels from its parent video. Thus, given a cluster 620 of volumes, there will be a set of all of the preliminary labels 630 associated with volumes. For example, the first video of $CL_1$ in FIG. 6 has the associated preliminary labels "dog" and "cat," e.g., because its video metadata 117A contained those labels. Then, in a given cluster, the frequency and/or percentage of occurrence of each preliminary label is determined. Then, clusters for which the contained volumes have preliminary labels that are not sufficiently consistent with each other are discarded as unreliable. The degree of label consistency may be quantified as, for example, the percentage of volumes that have the most frequently occurring preliminary label. For example, if the label "dog" is the most frequently occurring volume label in cluster $CL_1$, being a label for 80% of the volumes in that cluster, and if the threshold percentage for consistency is 75%, then each of the volumes with the label "dog" within $CL_1$ are selected as being representative of "dog" with high probability. By contrast, a cluster (such as $CL_k$ in FIG. 6) in which no label applied to more than 20% of volumes would clearly indicate that the volumes were associated with many different concepts. As a result of this step, using a relatively high threshold ensures that only clusters that are most likely representative of meaningful semantic objects are retained.

(B) Clustering Within Labels

Another method of feature determination is based on clusters according to labels. Here, a set of labels is created as the union of the preliminary labels of all of the volumes in all of the clusters. Then for each label, a list of the volumes having that label is determined. Since a volume can have multiple labels, it will appear in the list of volumes for each such labels. For example, a volume from a video with the labels "dog", "running", and "cat" would be added to a set of volumes for the label "dog", to a set of volumes for the label "running", and to a set of volumes for the label "cat." Volumes of videos lacking any labels are excluded from further processing.

The volumes in each of the label sets are then clustered according to the values of its feature vectors assigned by the feature determination module 410, e.g., using k-means clustering. This results—for every label—in a set of clusters of volumes with similar characteristics. For each cluster within a label, a degree of label consistency is quantified as above, and if a cluster is found to be representative of the same label as the label of the set of which it is a member, then the volumes with that label are selected as being representative of the label with high probability.

(C) Classifier Training

Figure 7:
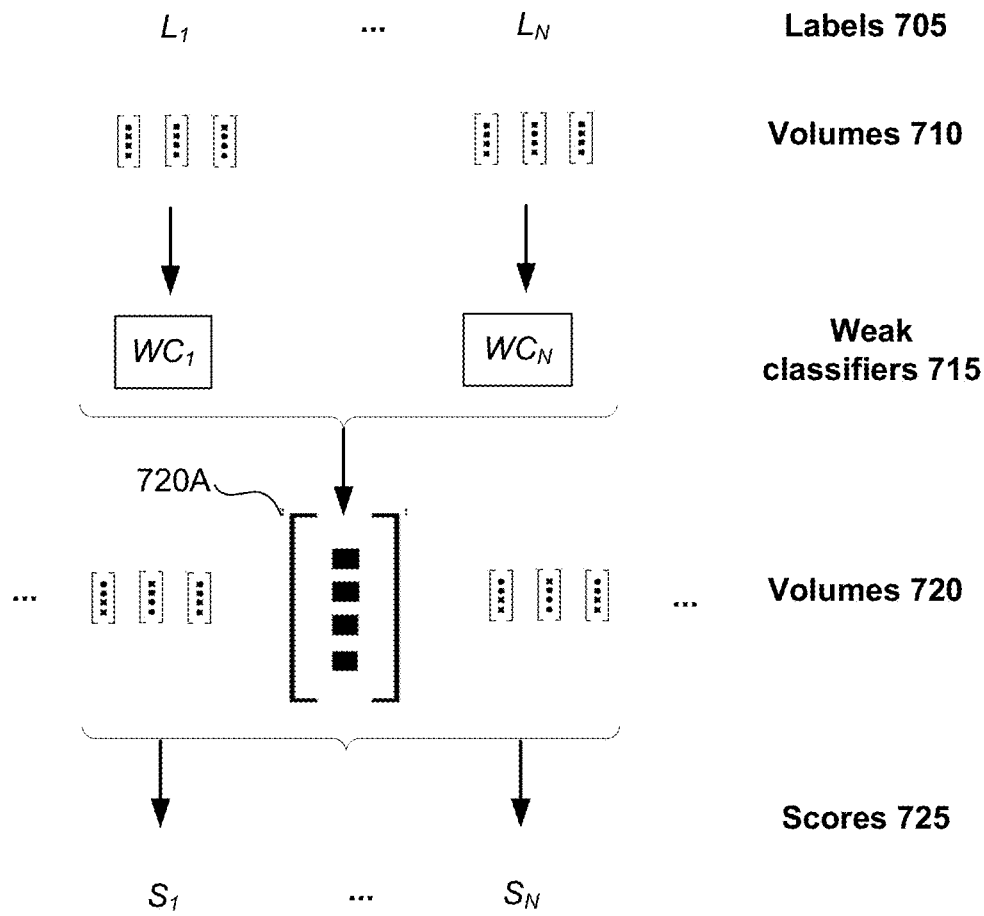
FIG. 7 illustrates a machine learning approach for volume labeling, according to one embodiment.

Another way of identifying meaningfully labeled volumes uses a machine learning approach, as illustrated in FIG. 7. Here, each volume in the volumes repository 430 is labeled with the labels of its parent video, as above. Then, the union of all labels is formed, resulting in a label set of tens or hundreds of thousands of labels. The set of labels may further be filtered to obtain a more useful set of labels, e.g., by discarding labels lacking some minimum frequency of occurrence in the label set. For each remaining label 705 (indicated in FIG. 7 as $L_1$ through $L_N$), all the volumes 710 (or some subset thereof) with that label are selected as the positive training set, and some (or all) of the volumes without that label are selected as the negative training set. A weak volume classifier 715 is then trained for each label using the positive and negative training sets for that label as input for an ensemble learning algorithm. In one embodiment, the ensemble learning algorithm employed is AdaBoost, with a number of stumps linearly proportional to the number of videos in the positive training set. Other learning algorithms, such as Support Vector Machine (SVM), the details of which are known to those of skill in the art of machine learning, could likewise be used.

The formation of the training sets relies on the accuracy of the labels for the volumes. However, given that the volume labels are merely taken from the labels of the parent video, it is unlikely that any given volume label will be accurate. For example, for the video with labels "dog", "cat", and "running", a volume that in fact depicts a dog will inherit all three labels, and the "cat" label will be incorrect (since the volume represents a dog, not a cat), and the correctness of the "running" label will depend upon whether the dog is, in fact, running. Hence, the accuracy of the volume classifiers will tend to be relatively poor. For example, such classifiers will typically produce an unusually large number of false positives due to the significant number of objects in the positive training set that do not in fact represent the object or action in question—e.g., mistakenly identifying a cat as a dog due to the training set for the label "dog" containing a large number of volumes representing cats. Nonetheless, the classifiers will still tend to produce very high scores for volumes that are in fact properly associated with the objects or actions corresponding to the classifier label—that is, although the classifiers may result in a number of false positives, they will typically not produce many false negatives.

Accordingly, in order to obtain accurate volume labels from the classifiers, each of the weak volume classifiers is applied to each volume 720 in the volumes repository 430, thereby producing a set of classifier scores for every volume. For example, FIG. 7 depicts applying each of the weak volume classifiers to a particular one of the volumes 720A, obtaining a set of scores 725 for that volume; the same would be done for each volume 720. The scores 725 for each volume are then normalized. Then, for each volume, the labels 705 corresponding to some set of the top classifiers scores 725 for that volume—e.g., the top score above some minimum value, and/or at least some threshold number of times as high as the average label score—are selected as the volume labels.

For example, the following table depicts example scores for classifiers for some example set of labels {"cat", "dog", "running", "truck", "penguin", ...} applied to some volume, normalized to the range [0, 1].

| | LABEL | | | | | |
|---|---|---|---|---|---|---|
| | "cat" | "dog" | "running" | "truck" | "penguin" | ... |
| SCORE | 0.2 | 0.95 | 0.162 | 0.05 | 0.17 | |

The score for the label "dog" is the highest score, considerably higher than the scores for any of the other labels, and is above a minimum score threshold, and hence is selected as a label for the volume. Since classifier scores that are far higher than other scores tend to be accurate, even when obtained from relatively inaccurate, noisy classifiers, the label "dog" can be applied to the volume with a high degree of confidence.

Note that all of the above approaches permit labeling ones of the candidate volumes with high accuracy. As a result, although in some embodiments only a small percentage of the volumes in the volumes repository 430 are labeled, those volumes that are labeled serve as strong exemplars of their respective labels. Further, presuming that the video repository 116 contains a large number of videos 117, there are still likely to be significant number of labeled volumes for the majority of the possible labels. Finally, it should be noted that the above approaches can be used together. For example, all three approaches can be used, and for given video, if the labels from two or more of the methods match, that indicates that the label is very likely to be accurate for the volume.

Applications

As a result of the actions of the volume labeling module 415, some of the volumes 430 have high-confidence labels, also referred to as "verified labels." These verified (high-confidence) labels can be used for a number of applications, such as training more accurate volume classifiers, providing more granular user video search, and enabling users to more easily form composite videos containing volumes of interest.

(A) Classifier Training

The verified labels can be used to train highly accurate volume classifiers for assigning labels to new volumes not already analyzed by the modules 405-415. The classifier training in the embodiment described above with respect to FIG. 7 results in weak classifiers 715 with a relatively low degree of accuracy because of the inaccuracy of the training sets used to train the classifiers. However, using the verified labels, a new set of classifiers of greater accuracy can be trained. That is, for every label, a positive training set is formed comprising the feature vectors of volumes having that label among their verified labels, and a negative training set is formed comprising the feature vectors of volumes not having that label among their verified labels. Then, higher-accuracy volume classifiers are trained, e.g., using the same ensemble learning algorithms mentioned above, such as AdaBoost or linear SVM, or another appropriate classifier algorithm. The result is then a set of classifiers corresponding to the high confidence labels.

(B) Enhanced Labeling

Using the higher-accuracy volume classifiers, the set of volumes with verified labels may be further expanded. That is, the higher-accuracy volume classifiers may then be applied to prior volumes, e.g., to the volumes of the volume repository 430 that are not already labeled with a verified label. Specifically, each of the trained high-accuracy classifiers is applied to the feature vector of the weakly labeled volume. The classifier that provides the highest score above some threshold (and optionally, with a minimum distance to the next highest score) provides the label for the volume.

Additionally, the volume identification module 119 may also label volumes of videos not already analyzed by the modules 405-415, such as videos submitted by users after the high-accuracy classifiers were trained. In this situation, the volume identification module 119 applies the volume segmentation module 405 to these new videos to segment the unlabeled volumes from the videos, applies the feature determination module 410 to obtain feature vectors for features of the same type used to train the classifiers, and finally applies the high-accuracy classifiers to the feature vectors to obtain verified labels for the corresponding volumes. Specifically, each of the trained high-accuracy classifiers is applied to the feature vector of the unlabeled volume. The classifier that provides the highest score above some threshold (and optionally, with a minimum distance to the next highest score) provides the label for the volume. This results in a set of volumes with verified labels that is larger than the set initially determined by the volume labeling module 415 alone.

Further, the metadata 117A of videos may be expanded based on the verified labels of the volumes within a video. For example, assume that the existing metadata 117A of a video comprises the labels "cat" and "yarn" (e.g., due to the video title "Adorable cat chasing after a ball of yarn"), and that the volumes within the video have, as verified labels, the labels "dog" and "running" If the labels "dog" and "running" are not already labels of the existing metadata 117A of the video, then the labels are added, e.g., as individual video tags. This increases the amount of useful information that a user can use to locate videos illustrating concepts of interest, such as dogs and/or things that run.

(C) Improved Video Search

With verified labels applied to video volumes—either the smaller set created by the volume labeling module 415, or the larger set created by the classifier training and application described directly above—users can submit more granular queries for particular video volumes matching concepts of interest, and not merely for entire videos. For example, when a user searches for the term "cat", the video search module 106 can take into consideration, not only the metadata 117A of a video 117 as a whole, but also the verified labels applied to the volumes within the video. The video search module 106 may thus identify videos that more accurately match the concepts in the user query. For example, the percentage of volumes having a label matching a search query can be used as an information retrieval measure to rank a given video, by increasing the ranking for videos with higher proportions of volumes matching the search query.

Figure 8:
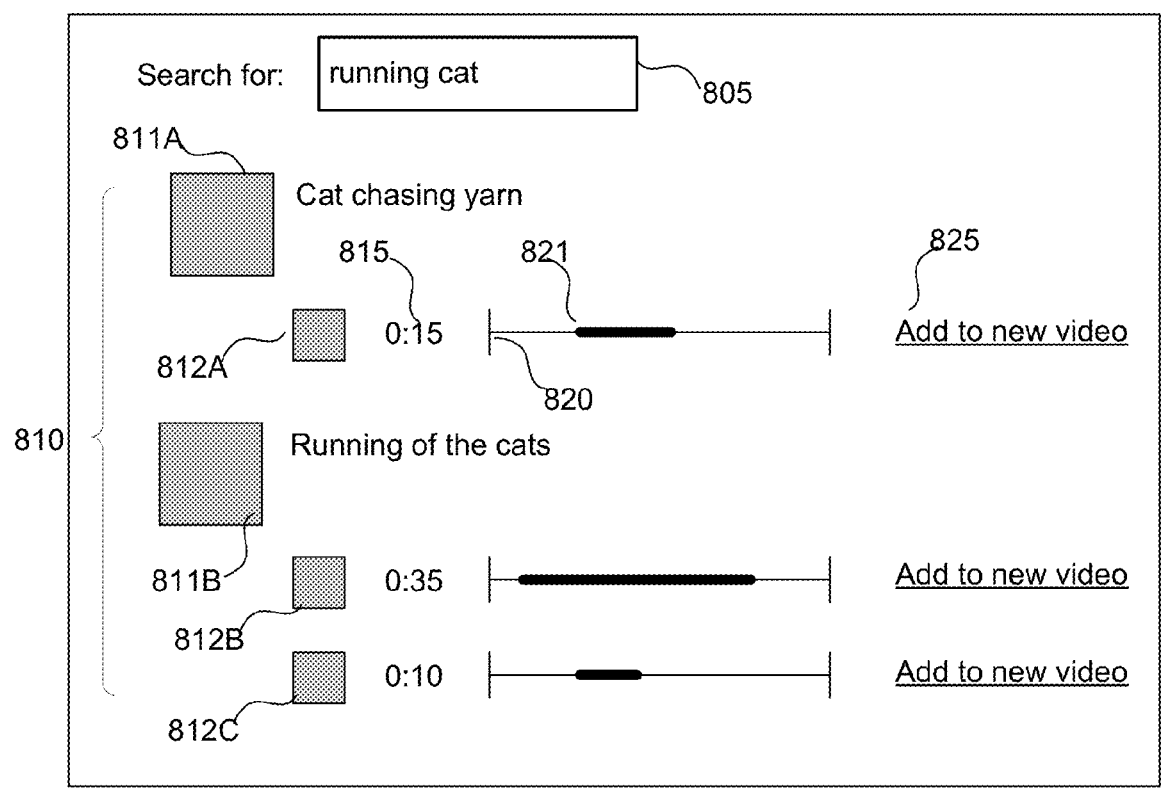
FIG. 8 illustrates a user interface showing search results that include video volumes, as well as videos as a whole, according to one embodiment.

Further, the video search module 106 may form result sets including not only videos as a whole, but also individual video volumes that match the user query. FIG. 8 illustrates a user interface showing search results that include video volumes, as well as videos as a whole, according to one embodiment. In response to the user query "running cat" entered in query area 805, the user interface displays a set of search results 810. The search results 810 may include both indicia of videos 811 and indicia of individual video volumes 812, each of the indicia displayed separately so as to be visually distinct from the other indicia. The indicia of a video volume in the search result set may include, for example, a visual thumbnail 812 specific to the volume (e.g., the corresponding spatial portion of a particular frame within the temporal portion of the volume), a duration 815 of the volume (e.g., "0:15", or 15 seconds), a visual indicator of a temporal portion of the video occupied by the volume (e.g., the highlighted portion 821 on the video timeline 820), etc. Selecting the search result for a volume 812 may cause playback of the video to begin at the start of the volume within the video, rather than at the start of the video as a whole. These features enable the user to both search for, and find, exactly the video content that matches the user's search query, without having to view all of the video. This is of particular use when the videos in which the volumes are located contain a large amount of unrelated content, e.g., a running cat appearing for only 10 seconds within a 30-minute nature documentary on different animals of the wild. Further, the volume may be visually emphasized during playback, e.g., by adding a visual highlight such as a colored box or polygon around the spatial portion of the volume, or by "blacking out" the portion of a frame not occupied by the selected volume.

(3) Finding Similar Volumes

The user interface produced by the front end interface 102 can be augmented to allow a user to quickly search for volumes similar to a volume being currently displayed. For example, assume a user is watching a video that has been processed in the manner described above, so that the particular volumes for that video are known. The user can then select a volume currently displayed in a video playback area (e.g., clicking on it) and then select an option such as "Find more like this." In response to the selection of the option, the video search module 106 executes a query for other volumes having one of the same verified labels as the selected volume. Thus, for example, a user enthralled by the sight of a penguin sliding over the surface of an iceberg during playback of a video about life in the Antarctic could click on the volume containing the penguin to gain quick access to other scenes of penguins, either in that same video or in other videos, rather than having to input a text search term for "penguin."

Figure 9A:
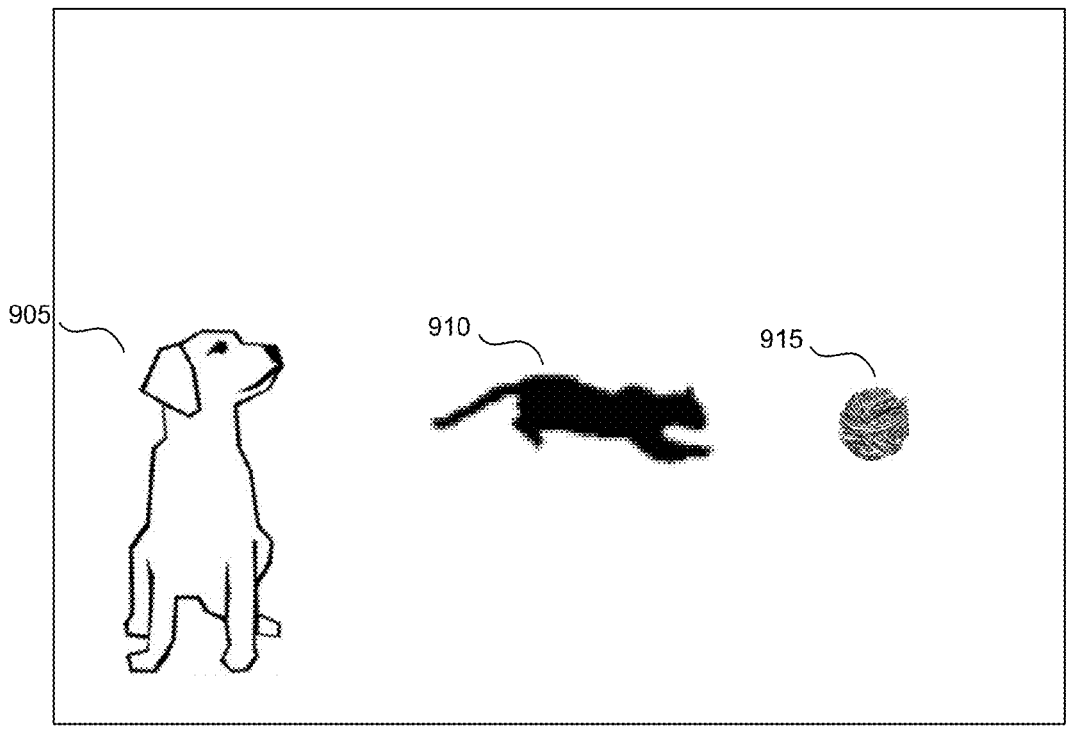
FIGS. 9A-9C illustrate techniques for visually emphasizing the selectable volumes within a video, according to some embodiments.
Figure 9B:
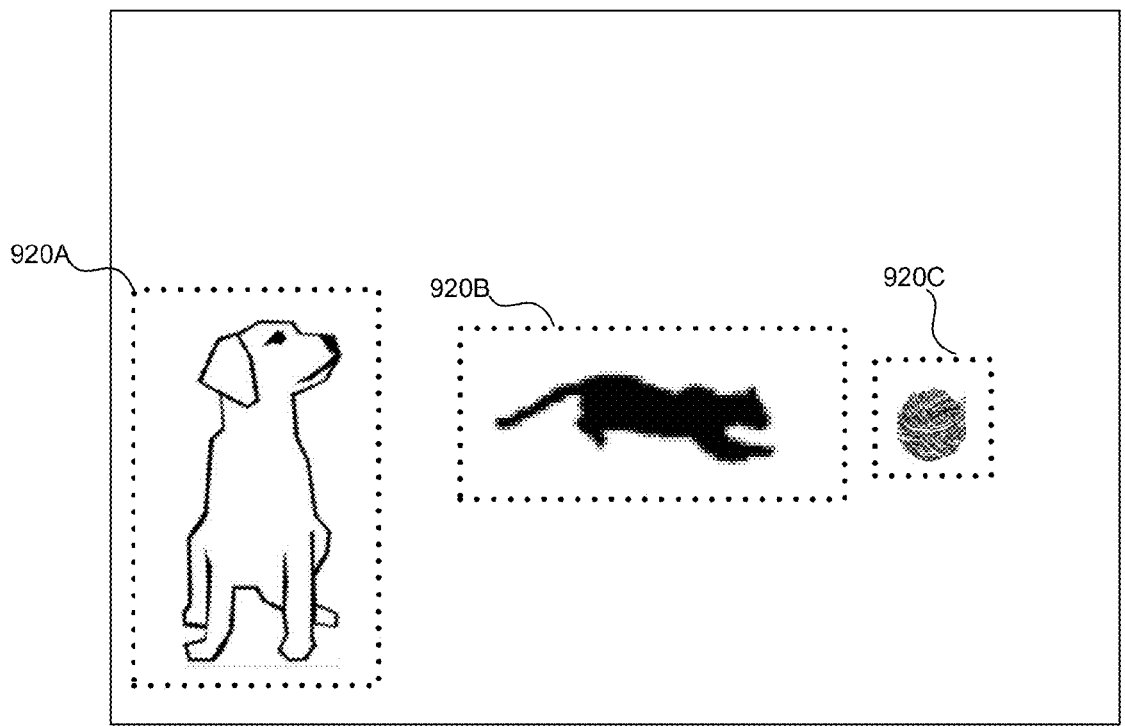
Figure 9C:
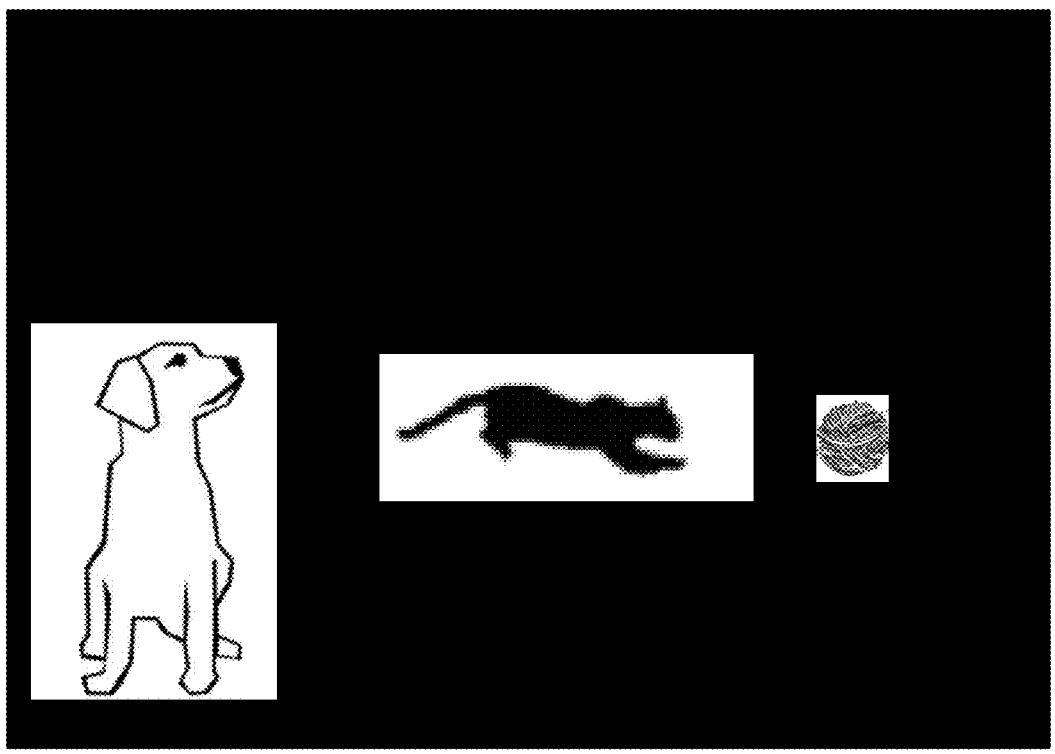

In order to make it easier for user to determine which volumes are selectable, in one embodiment the user interface includes a "Show volumes" option that visually highlights all selectable volumes within the video, e.g., by adding a colored highlight or outline to the volume, or by "blacking out" non-volume portions of the video frames, as noted above. For example, FIG. 9A illustrates a simple example video with a volume 905 corresponding to the image of a sitting dog watching a cat (represented by volume 910) chasing a ball of yarn (represented by volume 915). FIG. 9B illustrates a visual highlight 920 around each of the selectable volumes, and FIG. 9C illustrates the "blacking out" of all portions of the video frames not representing selectable volumes.

(E) Video Synthesis Using Video Volumes

Figure 10:
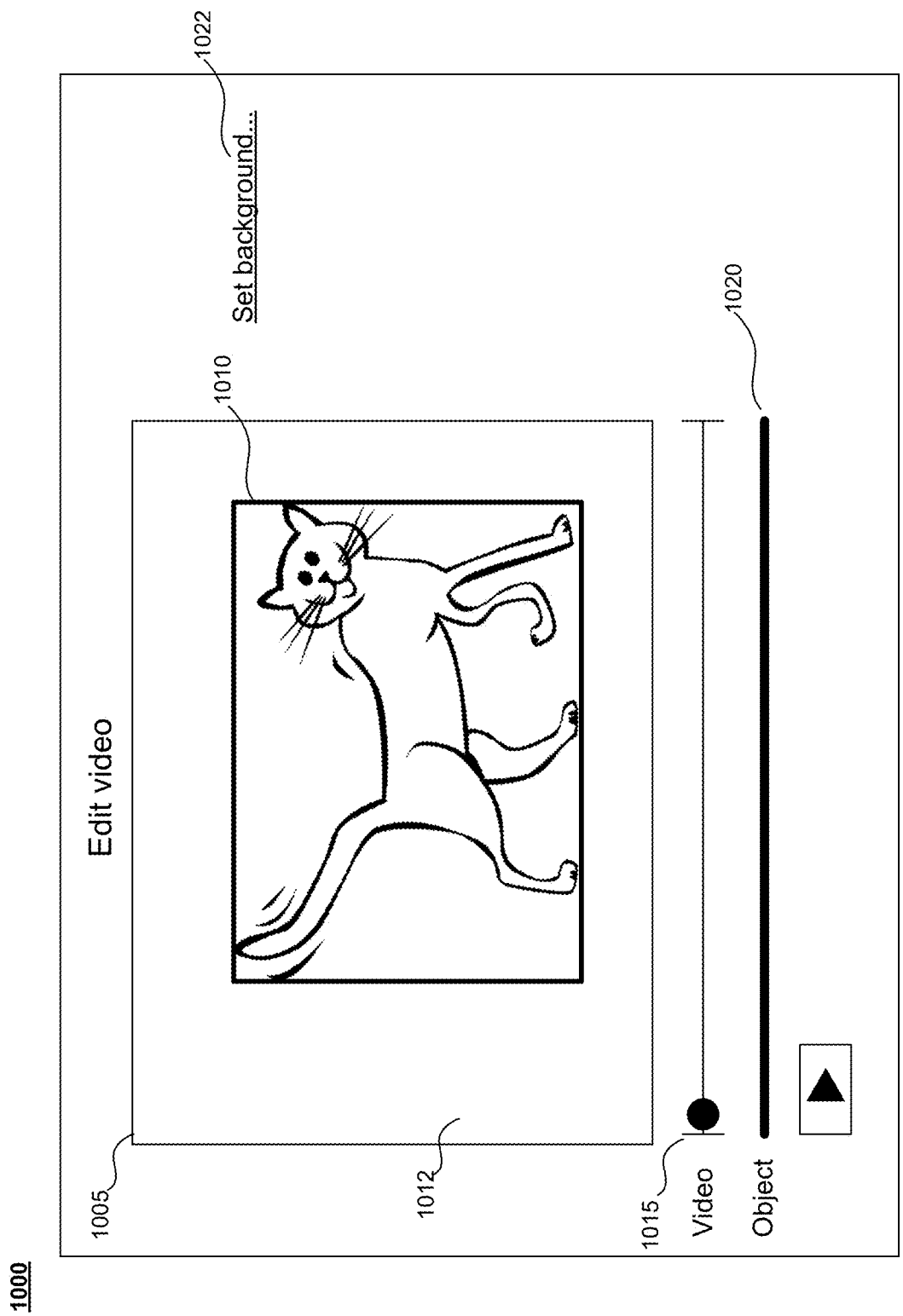
FIG. 10 illustrates an example user interface for editing a composite video containing a volume, according to one embodiment.

The ability of the volume identification module 119 to determine the precise temporal and spatial portion of a video occupied by a volume and thereby create a repository of labeled volumes also enables users to easily create a composite video from selected ones of the volumes. For example, referring back to FIG. 8, in one embodiment selecting the "Add to new video" link 825 for a particular volume leads to another user interface 1000 for creating and editing a new composite video containing the volume, as illustrated in FIG. 10. The example user interface 1000 of FIG. 10 includes a video area 1005 representing the entire size of the video frames, and a volume region 1010 representing the portion of the entire video frame occupied by the selected volume (a volume representing a cat, in this example). For example, the user interface can contain a standard video playback area, and a timeline 1015 for playing back the composite video.

The user interface 1000 further includes a mechanism to change the temporal portion of the video occupied by the selected volume. For example, the user can select the volume timeline 1020 representing the portion of the timeline 1015 occupied by the volume, dragging its outer edges inward or outward to change the duration of the volume. For instance, dragging the right edge inward would shorten the volume during playback by removing a corresponding portion of the end of the volume in some embodiments, or by increasing the playback speed of the volume in other embodiments. For volumes occupying less than the entire timeline, users may also drag the volume timeline 1020 left or right to alter the portion of the video during which the volume is played.

The user interface 1000 further includes a mechanism to change the spatial portion of the video occupied by the selected volume. For example the user can drag the corners of the volume region 1010 inward or outward to stretch or shrink the volume playback region proportionally in some embodiments, or to crop the region and other embodiments. Additional editing tools as would be useful for editing video can be provided as well, for example for scaling, rotating, or image processing the volume region 1010.

User interface 1000 further includes a mechanism for altering other visual properties of the video, such as the "Set background . . . " link 1022, which leads to a user interface to set a background occupying a region 1012 not occupied by the selected volume. The selected background can be a color, pattern, an image, another video, or the like.

Once completed, the final composite video can be saved in the video repository 116 and made available to users of the video sharing service 100.

The techniques set forth in this disclosure have been described in particular detail with respect to one possible embodiment. Those of skill in the art will appreciate that the techniques may be practiced in other embodiments. First, the particular naming of the components and variables, capitalization of terms, the attributes, data structures, or any other programming or structural aspect is not mandatory or significant, and the mechanisms that implement the embodiment or its features may have different names, formats, or protocols. Also, the particular division of functionality between the various system components described herein is merely for the sake of example, and not mandatory; functions performed by a single system component may instead be performed by multiple components, and functions performed by multiple components may instead performed by a single component.

Some portions of above description present the features of the disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

While the algorithms and operations presented herein are not inherently related to any particular type or brand computer or other apparatus, they necessarily must be implemented in a physical computing system, and cannot be implemented for any practical purpose by mere mental steps or calculation by the human mind. Various general-purpose systems may also be used with programs in accordance with the teachings herein, and when so implemented on a general purpose computer, such programs configure that computer into a particular apparatus. Alternatively, it may prove convenient to construct more specialized apparatuses to perform the required method steps. In either case, it is understood by those of skill in the art that these are equivalent implementations. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter.

Accordingly, the disclosure of the present disclosure is intended to be illustrative, but not limiting, of the scope of the disclosure, which is set forth in the following claims.

What is claimed is:

1. A computer-implemented method comprising:
identifying, in a plurality of digital videos, a plurality of candidate volumes representing spatio-temporal segments of the digital videos, wherein each of the candidate volumes corresponds to a contiguous sequence of spatial portions of video frames of one of the digital videos, has a starting time and an ending time, and potentially represents a discrete object or action within the video frames, wherein identifying the candidate volumes in the digital videos comprises:
   stabilizing the digital videos using a video stabilization algorithm and
   identifying, as a stable segment, a contiguous sequence of frames in one of the digital videos in which a degree of background motion is below a threshold, using a measure of background motion produced by the video stabilization algorithm;
determining, for each of the identified candidate volumes, features characterizing the candidate volume, wherein the features are determined from visual properties of the spatial portions of the video frames contained in the candidate volumes; and
assigning a verified label to each volume of a plurality of the identified candidate volumes using the determined features, the verified label indicating a particular object or action represented by the volume to which the verified label is assigned.

2. The computer-implemented method of claim 1, wherein identifying the candidate volumes in the digital videos further comprises extracting a candidate volume from the identified stable segment using hierarchical graph-based video segmentation.

3. The computer-implemented method of claim 1, wherein determining features characterizing an identified candidate volume comprises:
   dividing each of a plurality of the candidate volumes into fixed-length segments;
   for each of the fixed-length segments, determining a segment feature vector characterizing visual properties of the segment;
   forming a feature codebook by clustering the segment feature vectors; and
   determining features for the candidate volume using the feature codebook.

4. The computer-implemented method of claim 1, wherein determining features characterizing an identified candidate volume comprises:
   dividing the identified candidate volume into fixed-length segments;
   determining a segment feature vector for each of the fixed-length segments;
   mapping each segment feature vector to a most similar codebook entry from a codebook of feature vectors; and
   forming a feature vector characterizing the candidate volume by normalizing a set of the most similar codebook entries.

5. The computer-implemented method of claim 1, wherein determining features characterizing an identified candidate volume comprises:
   dividing the candidate volume into fixed-length segments;
   determining a segment feature vector for each of the fixed-length segments;
   for at least one of the segment feature vectors:
      mapping each of a plurality of individual elements of the corresponding feature to a most similar codebook entry from a codebook of feature vectors; and
      forming, for the at least one of the segment feature vectors, a codebook entry histogram from the most similar codebook entries.

6. The computer-implemented method of claim 1, wherein ones of the plurality of digital videos are associated with labels, and wherein assigning a verified label to a volume comprises:
   associating, with each of the candidate volumes, preliminary labels associated with the digital video in which the candidate volume was identified;
   clustering the candidate volumes into a plurality of clusters according to their determined features;
   determining, for each of the clusters, a degree of label consistency of the preliminary labels associated with the candidate volumes in the cluster; and
   assigning, as a verified label, to a candidate volume in a cluster with at least a given threshold degree of label consistency, a label with a high degree of occurrence in the cluster.

7. The computer-implemented method of claim 1, wherein ones of the plurality of digital videos are associated with labels, and wherein assigning a verified label to a volume comprises:
   associating, with each of the candidate volumes, preliminary labels associated with the digital video in which the candidate volume was identified;
   forming a union of all of the preliminary labels of all of the candidate volumes;
   for each label of a plurality of preliminary labels of the union:
      identifying the candidate volumes associated with the label;
      clustering the identified candidate volumes into a plurality of clusters according to their determined features;
      determining, for each of the clusters, a degree of label consistency; and
      assigning the label as a verified label to a candidate volume responsive to the candidate volume belonging to a cluster with at least a given threshold degree of label consistency and being associated with the label.

8. The computer-implemented method of claim 1, wherein ones of the plurality of digital videos are associated with labels, and wherein assigning a verified label to a volume comprises:
   associating, with each of the candidate volumes, preliminary labels associated with the digital video in which the candidate volume was identified;
   forming a union of all of the preliminary labels of all of the candidate volumes;
   for each label of a plurality of the preliminary labels:
      identifying a training set of candidate volumes having the label;
      training a weak volume classifier using the determined features of the candidate volumes in the training set;
      obtaining candidate volume scores by applying the weak volume classifier to the candidate volumes;
      for each of the candidate volumes for which the corresponding score has at least some given threshold value, assigning the label to the candidate volume as a verified label.

9. The computer-implemented method of claim 1, further comprising:
for a first one of the verified labels:
forming a training set of candidate volumes to which the first one of the verified labels has been assigned; and
training a classifier using the determined features of the candidate volumes in the training set, the classifier configured to receive a candidate volume and to output a score indicating a degree of likelihood that the candidate volume contains a representation of the verified label.

10. The computer-implemented method of claim 9, further comprising:
identifying a volume in a digital video;
obtaining a score by applying one of the trained classifiers to the volume; and
responsive to the score having at least some given threshold value, adding the label corresponding to the classifier to video metadata of the video.

11. The computer-implemented method of claim 1, further comprising:
receiving a textual search query;
determining a match degree to which volumes of a digital video have a verified label matching the search query; and
including the digital video in a search result set of videos matching the search query, based at least in part on the match degree.

12. The computer-implemented method of claim 1, further comprising:
receiving a textual search query; and
responsive to a volume of a digital video in a search result set of video data matching the textual search query having a verified label matching the search query, including the volume in a search result set of video data matching the search query.

13. The computer-implemented method of claim 12, wherein the search result set includes a representation of the volume such that, when the representation is selected on a client device, playback of the video begins at a beginning frame of the volume.

14. The computer-implemented method of claim 1, further comprising:
receiving, from a client device, an indication of a volume being displayed on the client device and a request for volumes similar to the displayed volume;
identifying a verified label assigned to the indicated volume;
identifying other volumes that also have the identified verified label; and
providing, to the client device, a result set including the identified other volumes.

15. The computer-implemented method of claim 14, further comprising providing to the client a visual representation of a digital video containing the volume, wherein the displayed volume is visually emphasized in the visual representation by at least one of an outline, a highlight, and obscuring portions of frames of the video not including the displayed volume.

16. A computer-implemented method comprising:
transmitting from a client device a textual search query over a network to a video sharing service;
obtaining at the client device, from the video sharing service, a video data result set comprising indicia of a plurality of volumes of digital videos, each volume:
representing a contiguous sequence of spatial portions of video frames of one of the videos,
having a starting time and an ending time, and
representing a discrete object or action within the video frames, the discrete object or action having a label corresponding to the textual search query,
wherein the video sharing service obtains the volumes from the digital videos by:
stabilizing the digital videos using a video stabilization algorithm; and
identifying, as a stable segment, a contiguous sequence of frames in one of the digital videos in which a degree of background motion is below a threshold, using a measure of background motion produced by the video stabilization algorithm; and
displaying the indicia separately in a user interface.

17. A non-transitory computer-readable storage medium having executable computer program instructions embodied therein, actions of the computer program comprising:
identifying, in a plurality of digital videos, a plurality of candidate volumes representing spatio-temporal segments of the digital videos, wherein each of the candidate volumes corresponds to a contiguous sequence of spatial portions of video frames of one of the digital videos, has a starting time and an ending time, and potentially represents a discrete object or action within the video frames, wherein identifying the candidate volumes in the digital videos comprises:
stabilizing the digital videos using a video stabilization algorithm; and
identifying, as a stable segment, a contiguous sequence of frames in one of the digital videos in which a degree of background motion is below a threshold, using a measure of background motion produced by the video stabilization algorithm;
determining, for each of the identified candidate volumes, features characterizing the candidate volume, wherein the features are determined from visual properties of the spatial portions of the video frames contained in the candidate volumes; and
assigning a verified label to each volume of a plurality of the identified candidate volumes using the determined features, the verified label indicating a particular object or action represented by the volume to which the verified label is assigned.

18. The non-transitory computer-readable storage medium of claim 17, the actions further comprising:
receiving a textual search query; and
responsive to a volume of a digital video in a search result set of video data matching the textual search query having a verified label matching the search query, including the volume in a search result set of video data matching the search query.

19. A computer system comprising:
a computer processor; and
a computer-readable storage medium having executable computer program instructions embodied therein that when executed by the computer processor perform actions comprising:
identifying, in a plurality of digital videos, a plurality of candidate volumes representing spatio-temporal segments of the digital videos, wherein each of the candidate volumes corresponds to a contiguous sequence of spatial portions of video frames of one of the digital videos, has a starting time and an ending time, and potentially represents a discrete object or action within the video frames, wherein identifying the candidate volumes in the digital videos comprises:

stabilizing the digital videos using a video stabilization algorithm; and identifying, as a stable segment, a contiguous sequence of frames in one of the digital videos in which a degree of background motion is below a threshold, using a measure of background motion produced by the video stabilization algorithm;

determining, for each of the identified candidate volumes, features characterizing the candidate volume, wherein the features are determined from visual properties of the spatial portions of the video frames contained in the candidate volumes; and assigning a verified label to each volume of a plurality of the identified candidate volumes using the determined features, the verified label indicating a particular object or action represented by the volume to which the label is assigned.

20. A computer-implemented method comprising:

accessing a plurality of digital videos having video-level metadata; and using the video-level metadata to:

automatically identify a temporally contiguous sequence of spatial portions of a first one of the videos, the temporally contiguous sequence of spatial portions representing both a temporal subset of the video and a spatial subset of the video, wherein identifying the temporally contiguous sequence of spatial portions comprises:

stabilizing the digital videos using a video stabilization algorithm, and identifying, as a stable segment, a contiguous sequence of frames in one of the digital videos in which a degree of background motion is below a threshold, using a measure of background motion produced by the video stabilization algorithm, and automatically label the temporally contiguous sequence of spatial portions with an identifier of an object or action represented by the temporally contiguous sequence of spatial portions.

* * * * *